March 20, 1951     W. G. MILLER     2,545,789
INSERTABLE STRAINER
Filed May 10, 1947

INVENTOR.
Wesley G. Miller
BY
Florian G. Miller
Atty.

Patented Mar. 20, 1951

2,545,789

UNITED STATES PATENT OFFICE 2,545,789

INSERTABLE STRAINER

Wesley G. Miller, Erie, Pa., assignor to Hays Manufacturing Company, Erie, Pa., a corporation of Pennsylvania Application May 10, 1947, Serial No. 747,311

1 Claim. (Cl. 210—164)

This invention relates generally to strainers in pipe lines, and it relates more particularly to straight line strainers which may be inserted in a pipe line combined with flow control means.

Strainers heretofore used in pipe lines of the straight line type have been connected to a flanged portion of the pipe in such a manner that the strainer could not be repaired or replaced without moving the pipe lines to which the strainer was connected longitudinally. Although strainers have been made removable, they have been disposed at an angle to straight line movement of the fluid and thereby did not give efficient straining action because the fluid passed only through a small portion of the strainer. The means utilized for connecting a straight line strainer in a pipe line has heretofore been inefficient and many of the strainers broke off at the point where the strainer was connected to the flanged portion of the pipe line. No strainer member has heretofore been combined with a flow control device.

It is, accordingly, an object of my invention to provide a straight line strainer in a pipe line which may be removed from the pipe line without moving the connecting pipe lines longitudinally.

Another object of my invention is to provide an insertable strainer and associated flow control device for a pipe line which is simple in construction, economical in cost, easy to install, and efficient in operation.

Another object of my invention is to provide a straight line strainer in a pipe line in combination with a flow control device.

Another object of my invention is to provide an insertible strainer for a pipe line wherein all loose dirt may be removed.

Another object of my invention is to provide an insertible strainer which eliminates the requirement for a union in the line.

Figure 1:
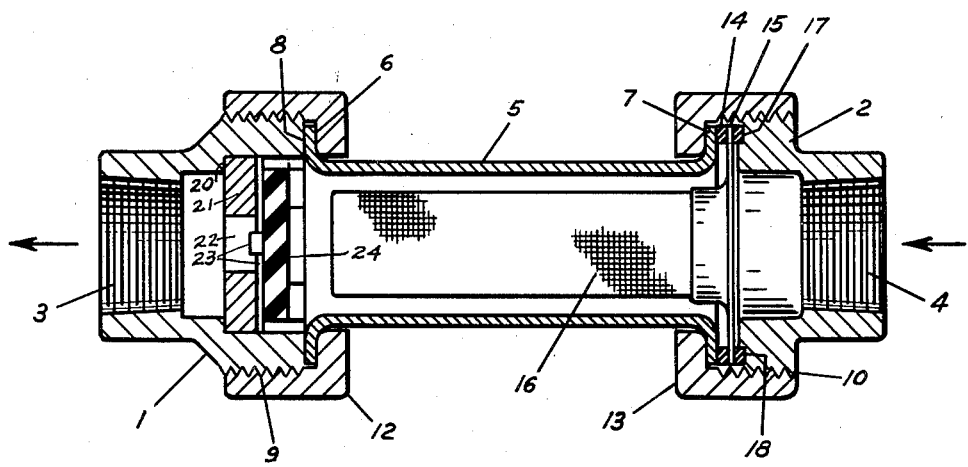
Figure 2:
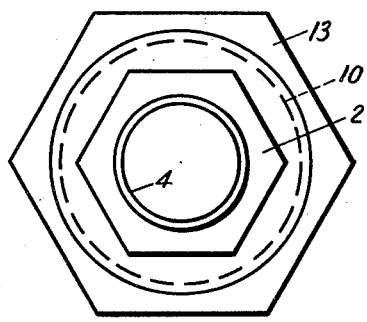

Other objects of my invention will become evident from the following detailed description, taken in conjunction with the accompanying drawings, in which;

Fig. 1 is a vertical sectional view of my novel combination insert strainer and flow control member disposed in a pipe line; and Fig. 2 is an end view of the member shown in Fig. 1.

Referring now to the drawings, Figs. 1 and 2 show complementary, oppositely disposed, fittings 1 and 2 having internally threaded portions 3 and 4 for connection to a pipe line. A tubular member 5, preferably made of copper or like material is flared outwardly at the ends 6 and 7 thereof and is disposed between the fittings 1 and 2. The flared end 6 seats on the face of fitting 1 in sealing engagement. Fittings 1 and 2 have externally threaded portions 9 and 10 threadably engaged by locking flange members 12 and 13. The flange member 12 locks the flared end 6 of the tubular member 5 into sealing engagement with the face 8 of the fitting 1. The flange member 13 engages the flared end 7 of the tubular member 5 and forces the flared end 7 into sealing engagement with a washer 14 which in turn sealingly engages the flanged portion 15 of a straight line strainer 16 disposed centrally of the tubular member 5. A washer 17 is disposed in groove 18 of fitting 2 on the opposite side of the flanged portion 15 of the strainer 16 to the washer 14, in sealing engagement therewith.

The fitting 1 has an internal shoulder 20 for seating a cup shaped member 21 having an aperture 22 with radially extending grooved passages 23 over which is disposed a flow control member 24 of suitable resilient material. Grooves 23 extend outwardly from the aperture 20 to provide a passage for fluid passing through the tubular member 5. Upon increase of pressure of the fluid in the pipe line, a portion of the resilient member 24 moves into the grooves 23 to restrict the cross-sectional area thereof to the flow of fluid and thereby maintain a constant quantity of fluid flowing out of the fitting 1.

When it is desired to insert my novel combined strainer and flow control member in a pipe line, it is merely necessary to thread the ends of two pipes in alignment and connect the fittings 1 and 2 thereto by threadable engagement with the threaded portions 3 and 4 of the fittings 1 and 2. The strainer member 16 is disposed in the tubular member 5 with the washer 14 and the flanged portion 15 in engagement with flared end 7. The washer 17 is disposed in the groove 18 in the fitting 2 before the tubular member 5 is disposed between the fittings 1 and 2. A tubular member 5 of suitable length is then disposed between the fittings 1 and 2 as shown in Fig. 1 and flange members 12 and 13 thereon are threadably engaged with the threaded portion 9 and 10 of the fittings 1 and 2. The fluid then passes through the strainer 16 to the flow control member 24 wherein it passes around the flow control member 24 and through the grooved passages 23 and out through the aperture 22. The flow control member 24 regulates the quantity of fluid passing from the fitting 1.

It will be evident from the foregoing description that I have provided a novel combined insertible straight line strainer and flow control device which may be inserted in any pipe line in a minimum of time and which may be readily removed for cleaning, repairing, or replacement.

Various changes may be made in the specific embodiment of my invention without departing from the spirit thereof, or from the scope of the appended claim.

What I claim is:

An insertable straight line strainer for insertion in a pipe line comprising opposed fittings being flanged and having an externally threaded portion and opposed parallel faces, a flanged strainer member having an outwardly directed flange on one end thereof in engagement with the face of one of said fittings, an insertable tubular member having the ends thereof flared arcuately outwardly disposed between the faces of said fittings, one end of said flared portion of said tubular member engaging the flanged portion of said strainer, said strainer being disposed in said tubular member, and internally threaded, L-shaped members disposed on said tubular member and longitudinally movable thereon having the internally threaded portion thereof threadably engageable with the externally threaded portion of said fittings to sealingly engage the flared out portions of said tubular member, the flared out portion of said tubular member in engagement with said flanged portion of said strainer member being in sealing engagement therewith, and washers disposed on opposite sides of the flanged portion of said strainer member.

WESLEY G. MILLER.

REFERENCES CITED

The following references are of record in the file of this patent:

UNITED STATES PATENTS

| Number | Name | Date |
|---|---|---|
| 427,447 | Thomson | May 6, 1890 |
| 664,280 | Leland | Dec. 18, 1900 |
| 1,983,330 | Welch | Dec. 4, 1934 |
| 2,375,646 | Grossi | May 8, 1945 |